(12) United States Patent
Sipkes

(10) Patent No.: US 6,597,767 B1
(45) Date of Patent: Jul. 22, 2003

(54) METHOD AND APPARATUS FOR SYNCHRONIZING ANALOG CALL DISPLAY DATA IN A DISTRIBUTED SYSTEM

(75) Inventor: Cornelis Sipkes, Ottawa (CA)

(73) Assignee: Mitel Corporation (CA)

( * ) Notice: Subject to any disclaimer, the term of this patent is extended or adjusted under 35 U.S.C. 154(b) by 476 days.

(21) Appl. No.: 09/671,395

(22) Filed: Sep. 27, 2000

(30) Foreign Application Priority Data

Sep. 29, 1999 (GB) .............................................. 9922987

(51) Int. Cl.⁷ .............................................. H04M 11/00
(52) U.S. Cl. ................ 379/90.01; 379/93.23; 379/373.01; 379/245
(58) Field of Search ................ 379/90.01, 93.23, 379/142.01, 142.17, 156, 164, 183, 373.01, 245, 396, 372

(56) References Cited

U.S. PATENT DOCUMENTS

| | | |
|---|---|---|
| 5,230,018 A | 7/1993 | Gericke |
| 5,396,548 A | 3/1995 | Bayerl et al. |
| 5,712,624 A | 1/1998 | Ayerst et al. |
| 5,761,279 A * | 6/1998 | Bierman et al. ......... 379/93.23 |
| 5,761,287 A | 6/1998 | Kim |
| 5,790,939 A | 8/1998 | Malcolm et al. |
| 6,421,436 B1 * | 7/2002 | Yagi ........................ 379/93.23 |

FOREIGN PATENT DOCUMENTS

GB          2302631          1/1997

* cited by examiner

Primary Examiner—Melur Ramakrishnaiah
(74) Attorney, Agent, or Firm—Jones Day

(57) ABSTRACT

A method is provided of synchronizing analog call display data, comprising the steps of providing a ringing signal from a remote peripheral to a remote user in the event of a pending call initiated by a central controller, generating a predetermined go-ahead signal at the remote peripheral following application of a first full ringing cadence of the ringing signal to the remote user; and generating analog call data at a DSP device co-located with the central controller and transmitting the analog call data to the remote user upon receipt of the go-ahead signal.

6 Claims, 2 Drawing Sheets

1 = First ringing burst
2 = Setup guard time
3 = Analog data tone burst
4 = Post guard time
5 = Subsequent ringing burst

METHOD AND APPARATUS FOR SYNCHRONIZING ANALOG CALL DISPLAY DATA IN A DISTRIBUTED SYSTEM

FIELD OF THE INVENTION

This invention relates in general to telecommunications switching systems, and more particularly to an apparatus and method for the synchronization of analog call display data in a distributed system.

BACKGROUND OF THE INVENTION

In modern telecommunications systems design, digital signal processing (DSP) elements are being used increasingly for both the transmission and reception of analog tone-based data. Examples of such uses include call progress tones, call display data, modems, etc. In order to minimize the system cost impact of these devices, it is desirable to locate them as a centralized resource, against which traffic engineering principles can be applied. In this way, the resources can be allocated as needed from a general pool, and provisioned only to the extent required for the targeted traffic-handling capacity of the system. In fact, the DSP devices are often used as uncommitted processing elements. Their specific functions are often configured and activated, as required, by higher-order call control entities.

Certain types of analog data, such as call display to analog phones, are governed by very specific timing relationships to other related events. In particular, call display data must be presented according to a specific timing relationship, between the bursts of the first full ringing voltage cadence to an analog telephone. In distributed systems, ringing voltage generation and cadencing devices are located in a remote node (such as an analog peripheral), while the DSP tone generation facility is advantageously located in a central node (such as central switching and call control). This gives rise to difficulties in providing the necessary signal synchronization. Furthermore, with the industry evolution toward HDLC-based control protocols between nodes, maintaining these timing relationships is rendered even more difficult since any time latencies resulting from the control of HDLC functions may result in the overlap of analog data tones with ringing voltage application, thereby resulting in loss of data.

A typical traditional solution to this problem is to place separate DSP devices in the remote nodes, in order to deliver the timing-sensitive functions. Since these particular devices are located so as to service only a particular remote node, they are not available as centralized resources. However, this solution raises the system cost and development time, and complicates resource management.

SUMMARY OF THE INVENTION

The present invention addresses distributed telecommunications systems where the analog data is digitally encoded and transmitted to/from the various system nodes, in real time, using TDM channels. Examples of such encoding methods are PCM, ADPCM, etc.

In particular, the present invention provides an apparatus and a method for controlling remote time-sensitive analog functions in real time, regardless of the nature of the system's normal control mechanisms. For example, many new systems employ packet-based control protocols which tend, by their nature, to be time-indeterminate (due to error detection and correction requirements, congestion, buffer management, etc.). According to the present invention, time-sensitive DSP control is de-coupled from the system control by providing a real-time TDM-based feedback path directly between the DSP and the remote node. This has the added benefit that allocation of a DSP resource by a higher-order call control entity remains, for all intents and purposes, unchanged. The only modification to the traditional call control model is that TDM channels are established in both directions, rather than just toward the remote peripheral. Other control functions are invisible to the call control entity, and take place strictly between the DSP and the affected remote peripheral.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
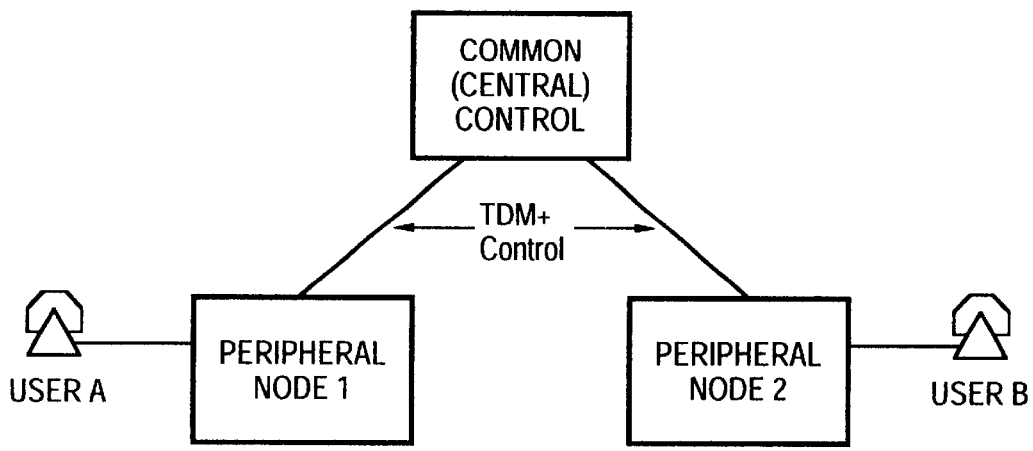
FIG. 1 shows a reference model for a distributed telecommunications system.

The process of allocating and controlling a time-sensitive function to a remote analog peripheral begins with the presentation of a call to the system. This can be either an external call (e.g., via the public network) or an internal call (e.g., another user on the same system, either of which is as shown in FIG. 1. The overall management of calls to Users A and B, via peripheral nodes 3A and 3B, respectively, is generally performed by a centralized call control entity 1, which is typically realized as a stored software program.

Figure 2:
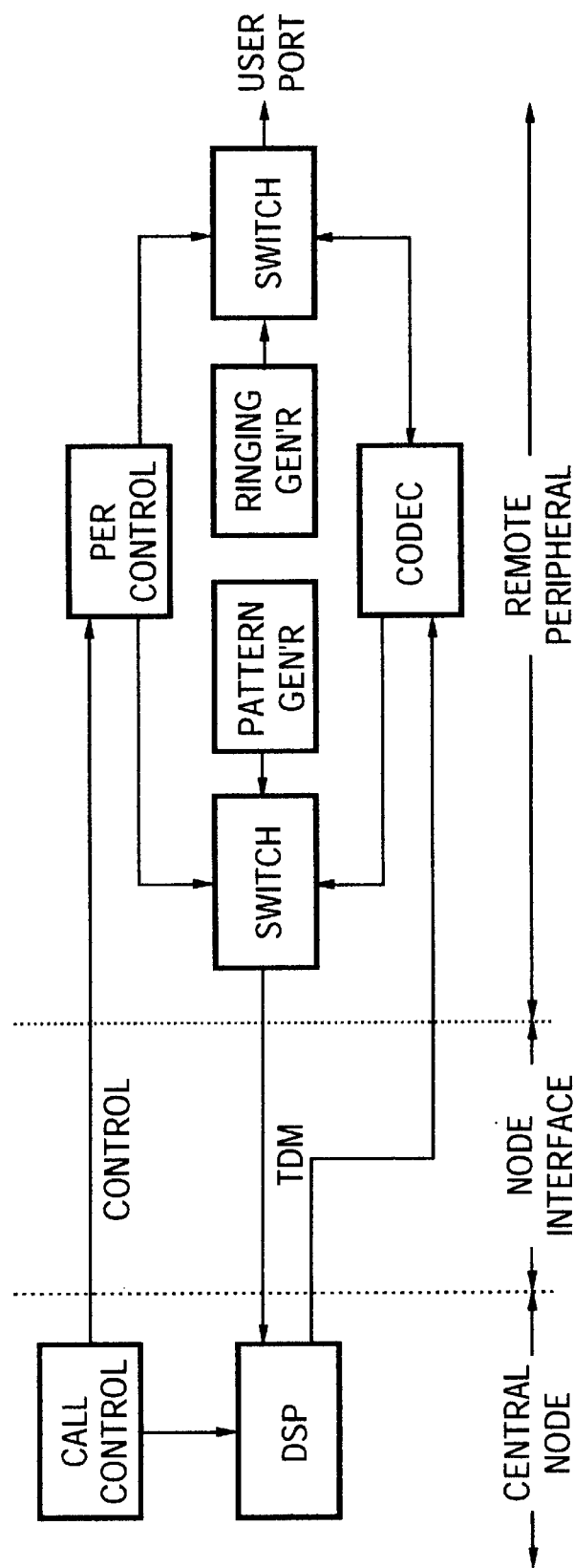
FIG. 2 is a block diagram showing a system for synchronizing analog call display data in a distributed system, according to a preferred embodiment of the invention.

With reference to FIG. 2, the call control entity 1 notifies both the centralized DSP 5 and the remote peripheral control 7 of a pending call, via the system's normal control protocols. Further, the DSP 5 is informed explicitly of the specific function to be provided (e.g., analog call display). The call control entity 1 also establishes a TDM path between the DSP 5 and the remote peripheral 7. Furthermore, according to the present invention, an additional TDM path is established in the direction between the remote peripheral to the DSP 5. Further interactions then take place directly between the DSP 5 and the remote peripheral over the bi-directional TDM channels until such time as the function has completed, whereupon call control 1 is notified in the normal manner.

Figure 3:
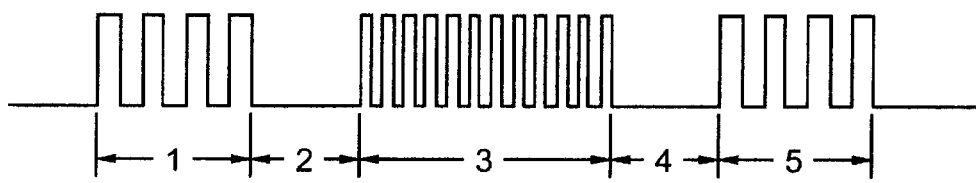
FIG. 3 is a timing diagram showing provision of analog call display data within a cadenced ringing cycle, in accordance with the present invention.

Using the analog call display function as an example (FIGS. 2 and 3), the DSP 5 configures itself for the function requested by call control 1 (i.e., call display). It then monitors the inbound TDM channel from the remote node for receipt of a "go-ahead" signal. Any unique value or pattern may be used for the go-ahead signal, however an all-zero or all-one byte value should not be used, since such values can be present in idle TDM channels.

At the same time, the remote peripheral control 7 begins the process of alerting the destination user. This is done by setting the user port-side switch 15 toward the ringing generator 13 and applying the first ringing burst to the user port. Unlike the central node, the remote peripheral control 7 has real-time knowledge of the voltage at the user's port.

Once the first full application of the cadenced ringing voltage has been completed, and after a further suitable guard time, the remote peripheral control 7 sets the node interface-side switch 9 to the pattern generator 11 and transmits the go-ahead signal back toward the waiting DSP 5. Since this data is carried within a TDM channel, the latency time is, generally, much less than one millisecond.

Upon receipt of the go-ahead signal, the DSP 5 immediately commences transmission of analog data tones, again incurring a latency time of less than one millisecond. Explicit feedback from the DSP 5 to the remote peripheral is not required, since each entity can henceforth proceed with its tasks independently (i.e., completion of the normal ringing cadence timing).

On completion of the properly-timed transmission of analog data tones, the DSP 5 informs call control 1 of the completion of its task. Call control 1 then de-assigns the DSP 5 and awaits an indication from the remote peripheral of normal call completion (i.e. user answer or timeout of ringing).

Alternative embodiments and variations of the invention are possible within the sphere and scope as set forth in the claims appended hereto.

I claim:

1. A distributed telecommunications system for synchronizing analog call display data, comprising:

a call control entity for generating call control signals:

a remote peripheral for providing a ringing signal to a remote user upon receipt of a pending call control signal from said call control entity and, after application of a first full ringing cadence to said remote user, generating a predetermined go-ahead signal; and a centralized DSP device co-located with said call control entity for receiving a further signal from said call control and in response configuring itself for generation of analog call data, and thereafter receiving said go-ahead signal from said remote peripheral and in response transmitting said analog data.

2. The distributed telecommunications system of claim 1, wherein said call control entity imposes a latency delay between application of said first full ringing cadence and said analog data.

3. The distributed telecommunications system of claim 1, wherein said analog data represents call display information.

4. A method of synchronizing analog call display data, comprising the steps of:

providing a ringing signal from a remote peripheral to a remote user in the event of a pending call initiated by a central controller;

generating a predetermined go-ahead signal at said remote peripheral following application of a first full ringing cadence of said ringing signal to said remote user; and generating analog call data at a DSP device co-located with said central controller and transmitting said analog call data to said remote user upon receipt of said go-ahead signal.

5. The method of claim 4, further including the step of introducing a latency delay between application of said first full ringing cadence and the generation and transmission of said analog data.

6. The method of claim 4, wherein said analog data represents call display information.

* * * * *